(12) United States Patent
Halleron et al.

(10) Patent No.: US 6,561,166 B2
(45) Date of Patent: May 13, 2003

(54) PURGE FUEL CANISTER MEASUREMENT METHOD AND SYSTEM

(75) Inventors: Ian Halleron, Chelmsford (GB); Jon Dixon, Maldon (GB)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/861,983

(22) Filed: May 16, 2001

(65) Prior Publication Data

US 2001/0052339 A1 Dec. 20, 2001

Related U.S. Application Data

(60) Provisional application No. 60/211,085, filed on Jun. 13, 2000.

(51) Int. Cl.⁷ .............................................. F02M 33/04
(52) U.S. Cl. ........................ 123/519; 123/520; 123/676; 123/703; 123/443; 60/285
(58) Field of Search .............................. 123/519, 520, 123/295, 676, 703, 443, 698; 701/109, 103, 104; 60/285

(56) References Cited

U.S. PATENT DOCUMENTS

| | | | | |
|---|---|---|---|---|
| 4,986,070 A | * | 1/1991 | Abe | 123/520 |
| 5,245,975 A | * | 9/1993 | Ito | 123/520 |
| 5,426,938 A | | 6/1995 | Ogawa et al. | |
| 6,176,217 B1 | * | 1/2001 | Ohkuma et al. | 123/295 |
| 6,192,672 B1 | * | 2/2001 | Kerns | 123/520 |
| 6,209,526 B1 | | 4/2001 | Sun et al. | |

FOREIGN PATENT DOCUMENTS

| | | | |
|---|---|---|---|
| EP | 0488 254 A1 | 6/1992 | |
| EP | 1074706 A2 | 2/2001 | |
| JP | 6137223 | 5/1994 | |
| JP | 21606 | * 1/2002 | F02D/41/04 |
| WO | WO 94/20738 | 9/1994 | |
| WO | WO 99/14482 | 3/1999 | |
| WO | WO 99/32766 | 7/1999 | |

* cited by examiner

Primary Examiner—Henry C. Yuen
Assistant Examiner—Hai H. Huynh
(74) Attorney, Agent, or Firm—Brinks Hofer Gilson & Lione

(57) ABSTRACT

An engine controller system for a direct injection spark ignited internal combustion engine that is capable of operating a stratified mode where fuel is injected during a compression stroke of the engine and a homogeneous mode where fuels is injected during an intake stroke of the engine. The engine controller monitors adjusts the flow rate of the evaporated fuel vapors as a function of the catalyst temperature and the fuel level in the evaporated fuel vapors. The engine controller determines the fuel level in the evaporated fuel vapors as a function of the exhaust gas oxygen senor output.

11 Claims, 2 Drawing Sheets

PURGE FUEL CANISTER MEASUREMENT METHOD AND SYSTEM

REFERENCE TO RELATED APPLICATION

This application claims the benefit of U.S. Provisional Application No. 60/211,085, filed Jun. 13, 2000, titled "Measurement of Canister Purge Fuel Content in a Stratified Direct Injection Gasoline Engine."

BACKGROUND

This invention relates generally to the field of gasoline-based internal combustion engines and more specifically to direct injection engines.

Direct injection engines, also called "in-cylinder injection engines," inject fuel directly into the cylinders. Diesel engines commonly use direct injection. Gasoline engines, also called spark ignition engines, normally are port fuel injection engines that inject fuel via a carburetor or a fuel injector into the intake manifold or over the intake values into the cylinders. Recently, direct injection spark ignited ("DISI") engines have been proposed. A DISI engine requires the fuel to be injected at relatively high pressure. Such a DISI engine also requires that the air-fuel ratio be leaner than convention gasoline engines and the air-fuel ratio must remain within tighter margins.

DISI engines operate in a stratified mode or a homogenous mode. When a DISI engine is in the stratified mode, the combustion chambers contain stratified layers with different air/fuel mixtures. The strata closest to the spark plug contains a stoichiometric mixture, that is a slightly richer mixture, and subsequent strata contain progressively leaner mixtures. When the engine is in the homogeneous mode, a homogeneous mixture of air and fuel is injected into the combustion chamber. Homogeneous operation may be either lean of stoichiometry, at stoichiometry, or rich of stoichiometry.

When a DISI engine operates in the stratified mode, the fuel is injected late in the compression cycle, usually during a compression stroke. Because of the late injection, a very short time is available for mixing of the air and fuel in the cylinder. Stable combustion is obtained because the rich zone air/fuel mixture near the spark plug is within the combustion limits while the overall air/fuel mixture in the cylinder is leaner than the air/fuel mixture normally used when the engine is in the homogeneous mode. When the engine is in the homogeneous mode, fuel is injected during an intake stroke of the engine. More mixing time is available in the homogenous mode. The stratified mode is more fuel efficient than the homogenous mode.

Direct injection engines are commonly coupled to three-way catalytic converters to reduce CO, HC, and NOx emissions. When operating at air/fuel mixtures lean of stoichiometry, an NOx trap or an NOx catalyst is typically coupled downstream of the three-way catalytic converter to further reduce NOx emissions. The stratified mode may be used for light to medium loads and the homogeneous mode may be used for medium to heavy loads.

Gasoline engines typically collect evaporated fuel vapors from the gasoline tank in a carbon canister, also called a charcoal canister or an evaporative canister. The evaporated fuel vapors are purged from the carbon canister into the intake manifold and burned in the combustion chambers, that is in the cylinders, along with the fuel that is injected via the fuel injectors. Since the air-fuel ratio of the evaporated fuel vapors is not known, the net air-fuel ratio in the cylinder or in a strata in the cylinder is not known. Thus, it is desirable to measure the air-fuel ratio of the evaporated fuel vapors and control the air-fuel ratio injected into the combustion chambers accordingly. Traditionally, the fuel level of the evaporated fuel vapors is measured with an exhaust gas oxygen sensor, such as a switching HEGO sensor or a linear UEGO sensor. When the engine is running lean, the exhaust gas oxygen sensor may not be able to accurately detect the fuel level of the evaporated fuel vapors.

As gasoline engines become more efficient, that is they are run leaner, the exhaust gas sensors become less accurate or stop working. For example, a DISI engine operating in the stratified mode uses a much leaner mixture than when it is operating in the homogenous mode. The evaporated fuel vapors, which need to be burned, contain a homogenous mixture of air and fuel. However, the fuel level in the evaporated fuel vapors varies over time. Thus, traditional engines often shut off the flow of evaporated fuel vapors when the engine is running lean, for example in the stratified mode. Shut off of the flow of the evaporated fuel vapors limits the efficiency of the engine by limiting the time the traditional engine can be operated in the stratified mode.

Further, when a traditional DISI engine running in the stratified mode purges evaporated fuel vapors into the combustion chamber, the strata outside the rich stratified zone may be too lean to support combustion. This may result in large quantities of unburned fuel in the exhaust gas, which may result in an undesirable large exothermic reaction in the catalyst as the catalyst oxidizes the unburned fuel. If the evaporated fuel vapors contain too much fuel, making the mixture too rich, the torque produced by the engine undesirably increases.

SUMMARY

An engine controller for a direct injection spark ignited internal combustion engine can operate in a stratified mode where fuel is injected during a compression stroke of the engine and a homogeneous mode where fuels is injected during an intake stroke of the engine. The engine controller adjusts the flow rate of evaporated fuel vapors as a function of the catalyst temperature and the fuel level in the evaporated fuel vapors. The engine controller determines the fuel level in the evaporated fuel vapors as a function of the exhaust gas oxygen senor output.

The improved system and method of controlling a direct injection spark ignition engine is described. The improved system and method may use sensors that are found on existing DISI engines to indirectly measure the fuel level in the evaporated fuel vapors. The improved system and method allows the evaporated fuel vapors to be purged into the intake manifold when the engine is run lean. Thus, the engine operates longer in the more efficient stratified mode resulting in a lower fuel consumption.

The foregoing discussion has been provided only by way of introduction. Nothing in this section should be taken as a limitation on the following claims, which define the scope of the invention.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION

A. Definitions

AFR—Air to Fuel Ratio. The air to fuel ratio may be the mass of Air divided by the mass of fuel.
CFD—Computational Fluid Dynamics
CTS—Catalyst Temperature Sensor
DI—Direct Injection
DISI—Direct Injection Spark Ignition
EFC—Electronic Flow Control
EG—Exhaust Gas
EGR—Exhaust Gas Re-circulation
EGO—Exhaust Gas Oxygen
EMVA—Electro-Mechanical Valve Actuation
ETC—Electronic Temperature Control
HEGO—Heated Exhaust Gas Oxygen
MAP—Manifold Absolute Pressure
OHC—Overhead Cam
PCV—Positive Crankcase Ventilation
PFI—Port Fuel Injection
SI—Spark Ignited
SIDI—Spark Ignition Direct-injection
SOHC—Single Overhead Cam
Stoichiometric combustion—An ideal combustion in which the fuel is completely burned. In a stoichiometric combustion, all the Carbon is converted to CO2, all hydrogen is converted to H2O, and all the sulfur is converted to SO2.
TWC—Three-Way Catalyst or Three-Way Catalytic converter
UEGO—Universal Exhaust Gas Oxygen

B. Introduction

The improved system and method of controlling a direct injection spark ignition engine is described. The improved system and method may use sensors that are found on existing DISI engines to indirectly measure the fuel level in the evaporated fuel vapors. The improved system and method allows the evaporated fuel vapors to be purged into the intake manifold when the engine is run lean. Thus, the engine operates longer in the more efficient stratified mode resulting in a lower fuel consumption.

The following description of the preferred embodiments of the invention is not intended to limit the scope of the invention to these preferred embodiments, but rather to enable any person skilled in the art to make and use the invention.

C. Direct Injection System

Figure 1:
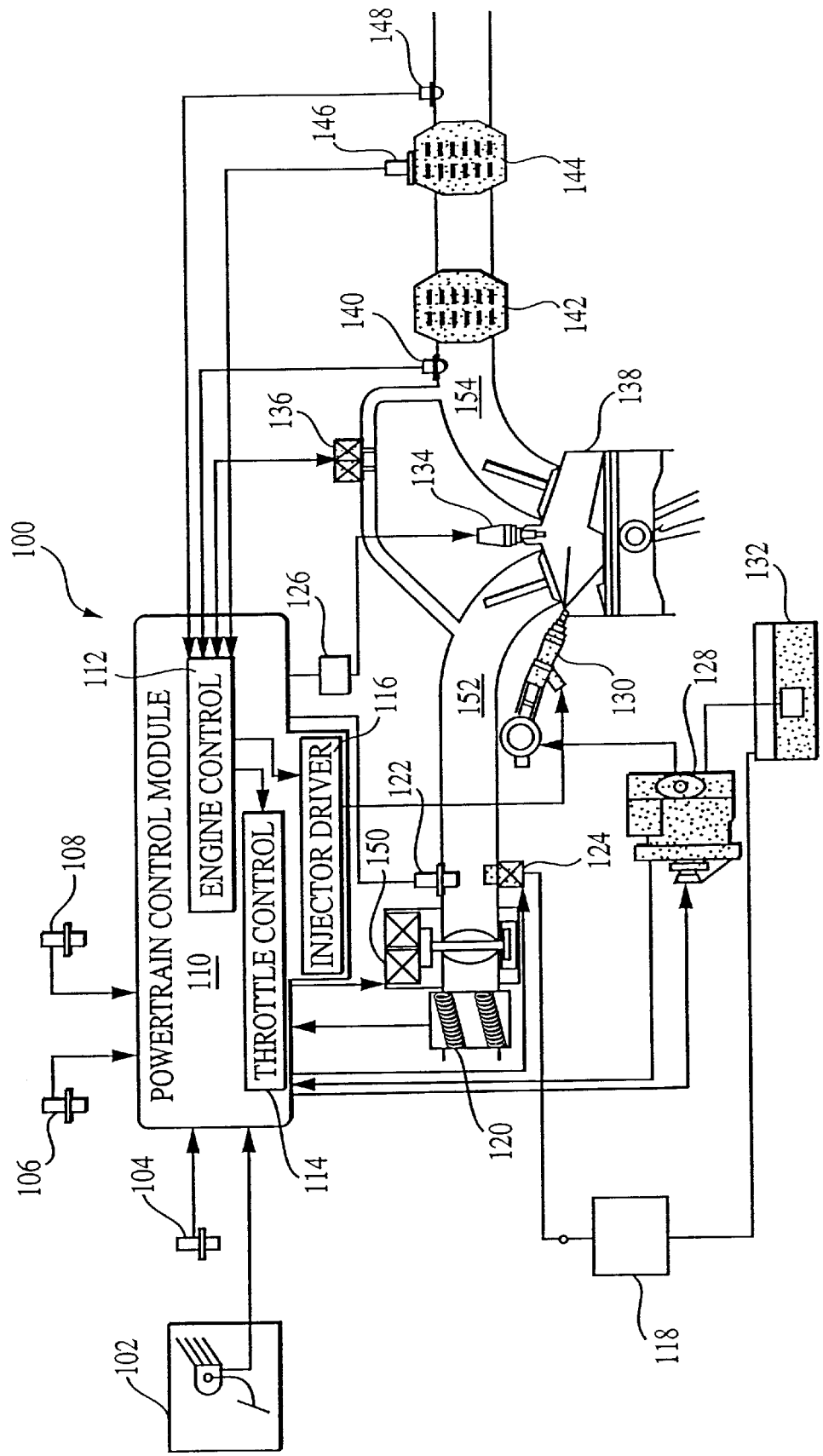
FIG. 1 illustrates a direct injection engine with an improved evaporated fuel vapors control system.

FIG. 1 illustrates an embodiment of a direct injection spark ignition ("DISI") engine 100. The DISI engine 100 may include such components as an accelerator pedal and sensor assembly 102, a crank angle sensor 104, a CAM position sensor 106, an engine coolant sensor 108 or cylinder head temperature sensor 108, a powertrain control module 110, an engine control module 112, a throttle control module 114, an injector driver module 116, a carbon canister 118, a temperature/mass air flow meter 120, a MAP sensor 122, a vapor management valve 124, an ignition control 126, a fuel pump 128, a fuel injector 130, a fuel tank 132, a spark plug 134, an exhaust gas re-circulation ("EGR") valve 136, a high compression engine 138, a universal exhaust gas oxygen ("UEGO") sensor 140, a three-way catalytic converter ("TWC") 142, a NOx trap/catalyst 144, a catalyst temperature sensor ("CTS") 146, a heated exhaust gas oxygen ("HEGO") sensor 148, a throttle 150, an intake manifold 152, and an exhaust manifold 154.

The evaporative fuel vapor system captures evaporative fuel vapors from the gasoline tank 132, stores the evaporative fuel vapor in the canister 118, and releases the vapors into the intake manifold 152 via the vapor management valve 124. The vapor management valve 124 may be controlled by the engine controller 112. The evaporative fuel vapors tend to be a homogeneous mixture of fuel vapors and air. The fuel level in the evaporative fuel vapors varies over time. The vapor management valve 124 may release the evaporative fuel vapors into the intake manifold 152. Then the evaporative fuel vapors enter the combustion chamber via an intake valve. The fuel injector 130 injects fuel directly into the combustion chamber. The injected fuel and the evaporative fuel vapors mix before combustion. The exhaust gases resulting from the combustion are exhausted via an exhaust valve into the exhaust manifold 154. The CTS 146 is located near the lean NOx trap/catalyst 144 and measures the temperature of the lean NOx trap/catalyst 144 during the cleansing of the wash coat of SOx to control poisoning.

The engine 100 is controlled by various engine controllers including the power train control module 110. The power train control module 110 may in include such controllers as an engine control 112, a throttle control 114, and an injector driver 116. For example, the power train control module 110 may include a canister purge valve controller for a direct injection spark ignited internal combustion engine that includes a temperature sensor interface that receives a temperature of a catalyst in the engine's exhaust system, an engine mode controller that switches the engine between a stratified mode and a homogeneous mode, and a canister purge valve interface that controls a flow rate of evaporated fuel vapors into the engine's intake manifold via a canister purge valve. The canister purge valve controller may control the flow rate of evaporated fuel vapors as a function of the temperature received by the temperature sensor interface and the engine's mode.

The components of the DISl engine 100 may include various variations of the devices described above. The fuel pump 128 may include a high pressure fuel pump, an electronically controlled pressure regulator, and a pressure sensor assembly. The fuel injector 130 may include a high pressure fuel rail assembly. The fuel tank 132 may include a feed pump. The EGR valve 136 may include an electric EGR valve. The engine 138 may include multiple cylinders, each with a direct injection fuel injector. The TWC 142 may include a quick light-off TWC. The NOx trap/catalyst 144 may include a lean NOx trap, a lean NOx catalyst, or other device to reduce NOx in the exhaust gas. The throttle 150 may include an electronic controlled throttle. Other variations in the components of the DISI engine 100 will also be apparent and within the scope of the invention.

Figure 2:
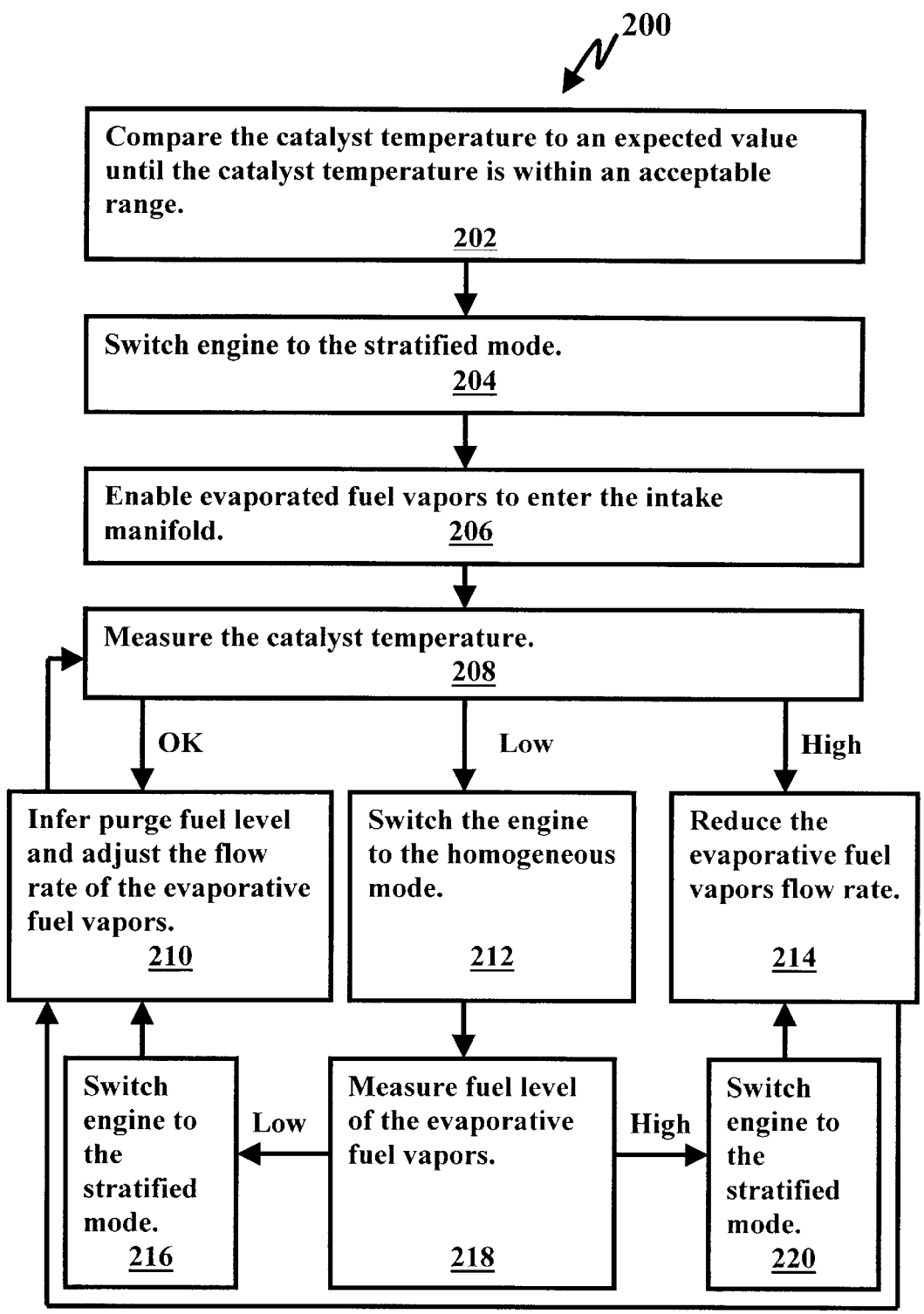
FIG. 2 illustrates a flow diagram of a method of controlling the direct injection engine of FIG. 1.

FIG. 2 illustrates a flow diagram of a method of controlling the DISI engine 100 of FIG. 1.

In block 202, the CTS 146 (FIG. 1) is tested to determine if it is operating within calibration limits without evaporated fuel vapors being introduced into the combustion chamber. The engine 100 (FIG. 1) may be in the homogeneous mode or the stratified mode during the calibration. The calibration includes comparing the catalyst temperature as measured by the CTS to an expected range. If the engine 100 is outside the calibration range, the engine 100 may be operated in the stratified mode with the evaporative fuel vapors turned off and in the homogeneous mode with the evaporative fuel vapors on or off. The activities in block 204 to 220 are not executed when the engine 100 is operating outside the calibration range.

In block 204, if the engine 100 is in the homogeneous mode, the engine 100 is switched to the stratified mode. The engine control 112 (FIG. 1) may control the mode of operation of the engine 100.

In block 206, the evaporated fuel vapors from the carbon canister 118 (FIG. 1) are allowed to enter the intake manifold 152 (FIG. 1). The flow rate of the evaporated fuel vapors may be controlled by the vapor management valve 124 (FIG. 1) and the engine control 112.

In block 208, the temperature of the catalyst is measured when the evaporated fuel vapors are being introduced into the combustion chamber. The temperature of the catalyst may be measured by the CTS 146. The catalyst temperature should rise after the evaporated fuel vapors are introduced due to the oxidation of the unburned fuel in the exhaust gas. The catalyst temperature change can be determined as the temperature difference between the temperature measured in block 208 and the temperature measured in block 202 or as the temperature difference between the temperature measured in block 208 and an expected temperature based on a temperature model.

In block 210, if the catalyst temperature change from block 208 is within an acceptable range, the engine can remain in the stratified mode with the evaporated fuel vapors being introduced, and the fuel level of the evaporated fuel vapors can be determined as a function of the temperature change measured in block 208. The acceptable range may have different upper and lower thresholds depending on various factors.

In block 214, if the catalyst temperature change from block 208 is above the acceptable range, the evaporated fuel vapors contain too much fuel. The flow rate of the evaporated fuel vapors may be adjusted, normally reduced, to allow some of the evaporated fuel vapors to be purged while maintaining the engine 100 in the stratified mode. The flow rate can be repeatedly reduced in block 214 until the catalyst temperature is within an acceptable range. Alternatively, the engine 100 could be switched to the homogeneous mode with the evaporated fuel vapors being purged at the same rate until the fuel level in the evaporated fuel vapors is reduced to an acceptable level for operation in the stratified mode.

In block 212, if the catalyst temperature change from block 208 is below the acceptable range, the fuel level in the evaporated fuel vapors is either low or very high. If the fuel level in the evaporated fuel vapors is very high, the entire stratified charge becomes combustible. To determine whether the fuel level in the evaporated fuel vapors is low or very high, the engine 100 is switched to the homogeneous mode, then block 218 is executed.

In block 218, after the engine 100 is switched to the homogeneous mode in block 212, the fuel level of the evaporated fuel vapors can be accurately measured via an EGO sensor, for example an UEGO. Then either block 216 or 218 is executed based on whether the EGO sensor indicates a high or low level of fuel in the evaporative fuel vapors.

In block 216, if the fuel level of the evaporated fuel vapors measured in block 218 is below a fuel level threshold, the engine is switched back to the stratified mode. Then, the purge fuel level is determined as a function of the catalyst temperature in block 210.

In block 220, if the fuel level of the evaporated fuel vapors measured in block 218 is above the fuel level threshold, the engine is switched back to the stratified mode. Then, the flow rate of the evaporated fuel vapors is reduced in block 214. Alternatively, the engine 100 could be operated in the homogeneous mode with the evaporated fuel vapors being purged at the same rate until the fuel level in the evaporated fuel vapors is reduced to an acceptable level for operation in the stratified mode.

The process or portions of the process described in blocks 202 to 220 may be repeated a number of times. Further, the process described in blocks 202 to 220 may be a component of a larger process that cycles the engine between the stratified mode and the homogeneous mode based on other factors, such as engine load, acceleration, and other factors.

As a person skilled in the art will recognize from the previous description and from the figures and claims, modifications and changes can be made to the preferred embodiments of the invention without departing from the scope of the invention defined in the following claims.

What is claimed is:

1. A method of controlling a direct injection spark ignited internal combustion engine that is capable of operating in a stratified mode where fuel is injected during a compression stroke of the engine and a homogeneous mode where fuels is injected during an intake stroke of the engine, the internal combustion engine having a catalytic converter and an $NO_x$ trap, comprising:

measuring a first temperature of an $NO_x$ trap that is in contact with an exhaust gas exhausted from a combustion chamber while the engine is operating in the stratified mode;

enabling evaporated fuel vapors to enter the combustion chamber at a flow rate while the engine is operating in the stratified mode;

measuring a second temperature of the $NO_x$ trap while the engine is operating in the stratified mode; and adjusting the flow rate of the evaporated fuel vapors as a function of the second temperature when the second temperature is within a lower temperature threshold and an upper temperature threshold.

2. The method of claim 1, further comprising:
   switching the engine to the homogeneous mode when the second temperature is below the lower temperature threshold.

3. The method of claim 2, further comprising:
   measuring a fuel level of the evaporated fuel vapors after the switching the engine to the homogeneous mode.

4. The method of claim 3, wherein the measuring the fuel level comprises measuring the fuel level via an exhaust gas oxygen sensor.

5. The method of claim 4, wherein the measuring the fuel level comprises measuring the fuel level with an universal exhaust gas oxygen sensor.

6. The method of claim 5, further comprising:
   switching the engine to the stratified mode when the measured fuel level in the evaporated fuel vapors is above a fuel level threshold.

7. The method of claim 6, further comprising lowering the flow rate after switching the engine to the stratified mode.

8. The method of claim 5, further comprising:
   switching the engine to the stratified mode when the measured fuel level in the evaporated fuel vapors is below the fuel level threshold; and
   adjusting the flow rate as a function of the second temperature.

9. The method of claim 8, further comprising:
   lowering the lower temperature threshold after switching to the stratified mode.

10. The method of claim 9, repeating the method of controlling a direct injection spark ignited internal combustion engine with the lowered lower temperature threshold.

11. The method of claim 1, further comprising:
    reducing the flow rate of the evaporated fuel vapors into the combustion chamber as a function of the difference between the first and second temperatures when the $NO_x$ trap temperature exceeds the upper temperature threshold.

* * * * *